B. TROPP.
SELF HEATING SOLDERING IRON.
APPLICATION FILED DEC. 2, 1905.
1,045,343.
Patented Nov. 26, 1912.
2 SHEETS—SHEET 2.
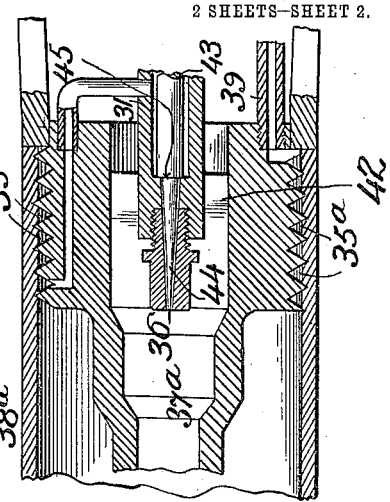
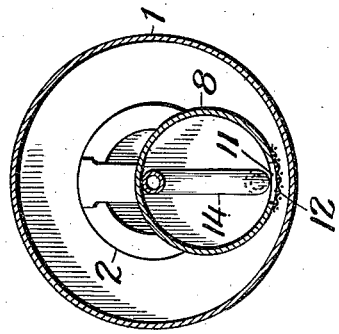
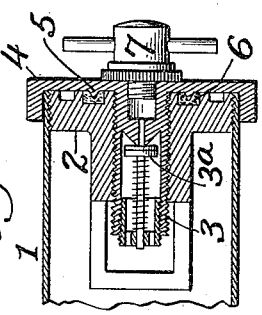
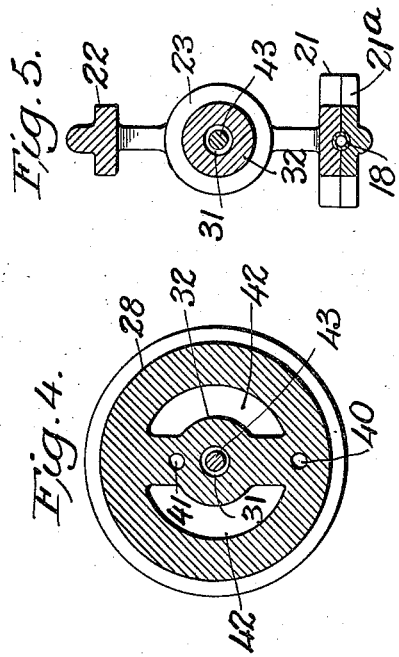
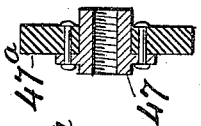
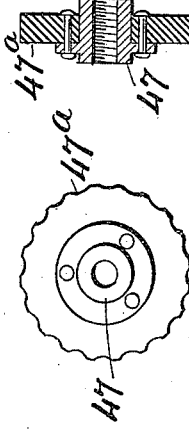
WITNESSES:
INVENTOR
Bernhard Tropp
BY
ATTORNEYS

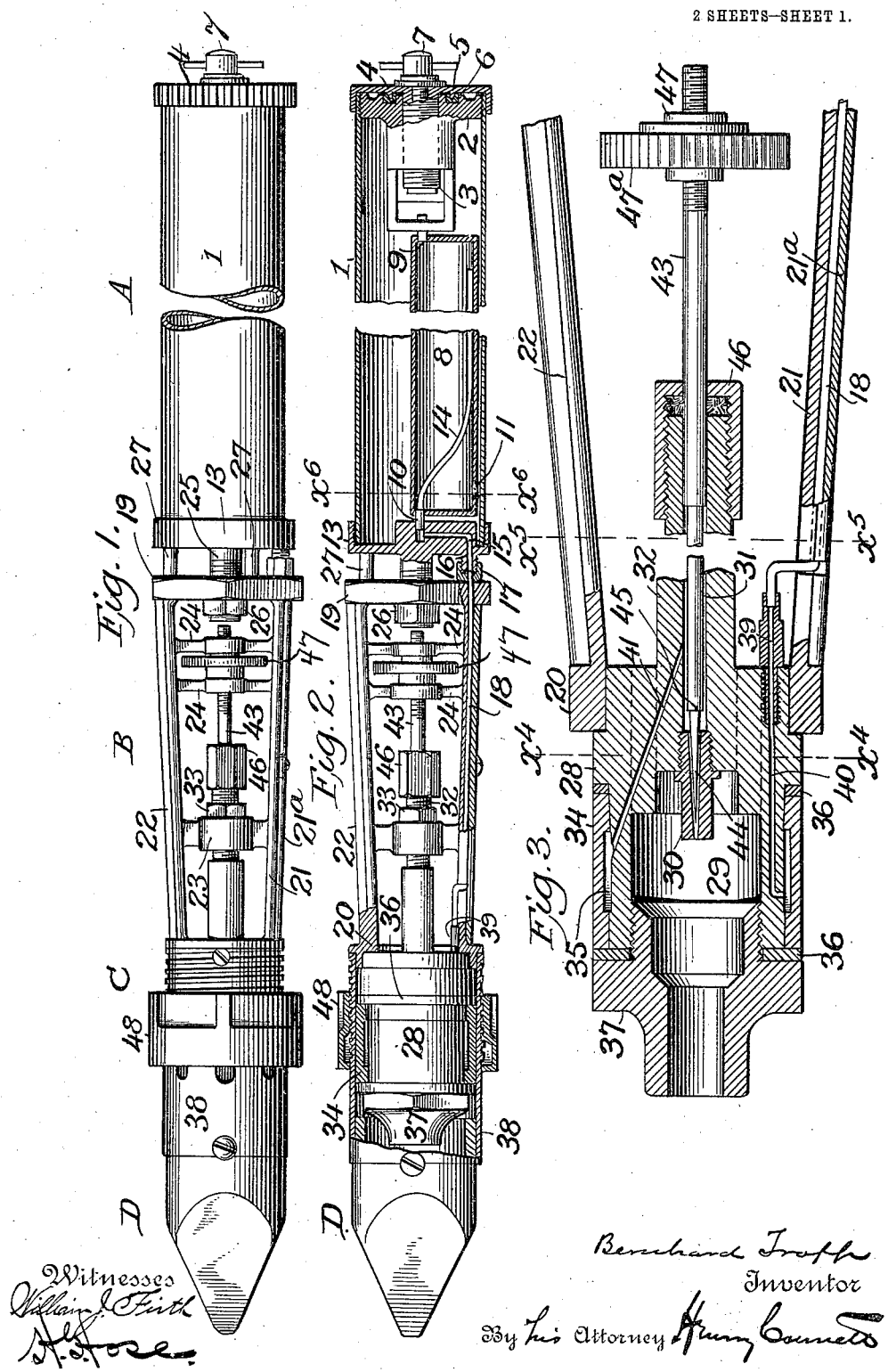

UNITED STATES PATENT OFFICE.

BERNHARD TROPP, OF NEW YORK, N. Y., ASSIGNOR TO WILLIAM HENRY LAIRD, OF NEW YORK, N. Y.

SELF-HEATING SOLDERING-IRON.

1,045,343.  Specification of Letters Patent.  Patented Nov. 26, 1912.

Application filed December 2, 1905. Serial No. 290,021.

*To all whom it may concern:*

Be it known that I, BERNHARD TROPP, a citizen of the United States, residing in the borough of Manhattan, in the city, county, and State of New York, have invented certain new and useful Improvements in Self-Heating Soldering-Irons, of which the following is a specification.

This invention relates to the class of devices or apparatus where a part is to be heated by the ignited vapor of a volatile liquid, such as gasolene, alcohol and the like; and it is herein shown as embodied in an implement or tool for soldering, commonly called a soldering iron, although the novel features of the invention may as well be embodied in devices or apparatus for other purposes or uses. In the class of tools to which this self-heating soldering iron belongs it has been proposed to provide the tool with a hollow handle to contain the store of volatile liquid, said handle having an inlet for the liquid, and outlet therefor, and an inlet for compressed air, to force the liquid from the reservoir in the handle through the outlet to the burner, the supply being controlled by a needle-valve. A vaporizer of some sort adjacent to the burner, serves to convert the volatile liquid into vapor or gas.

These tools have certain defects which it is the object of the present invention to remedy, said defects residing mainly in the needle-valve, in the reservoir for the liquid fuel and compressed air, in the vaporizer, and in several of the features of the construction.

The invention will be hereinafter described and its novel features carefully defined in the claims.

In the accompanying drawings, which serve to illustrate an embodiment of the invention—Figure 1 is a side elevation of a soldering tool or implement embodying the invention, and Fig. 2 is a sectional elevation of the same. Fig. 3 is an enlarged sectional detail of the device, showing the vaporizer and needle-valve. Figs. 4 and 5 are transverse sections at lines $x^4$ and $x^5$, respectively, in Fig. 3. Fig. 6 is a cross-section of the handle on the same scale as Fig. 3, the plane of the section being indicated by line $x^6$ in Fig. 2. Figs. 7 and 8 are, respectively, a face view and diametrical-section of the wheel-nut for operating the needle of the needle-valve. Fig. 9 is a sectional view of the air-valve casing, showing the air-valve. Fig. 10 is a sectional view illustrating another form of the vaporizer.

The major portions of the device are designated, as to position, by reference letters, A designating the hollow handle, herein shown as broken across for lack of room; B designating the stem, or connecting portion; C designating the portion where the burner and vaporizer are situated, and D designating the copper bit or soldering tip which is to be heated.

The handle A, consists, in the present construction, of a metal tube 1, of suitable length, to be grasped by the hand, and this tube has in it a chamber to be charged or filled with some combustible volatile liquid, usually gasolene, and compressed air forced in also to drive the liquid from the reservoir in the handle to the burner. But a difficulty with this arrangement is that in some of the positions in which it is necessary to hold a soldering tool, the air will interpose between the liquid and the liquid-outlet and thus stop the liquid feed.

To obviate this difficulty is one of the objects of the present invention, and the means employed to effect this object will now be described with especial reference to Figs. 2 and 6. Secured in the rear or outer end of the handle-tube 1, is a plug 2, having in it a bore to receive the air-valve casing 3, formed in one with a screw-cap 4, which screws onto the outer end of the tube 1. On the inner face of this cap is a sharp annular ring 5, which is pressed into a packing ring 6 in the plug 2 to form a tight joint. The casing 3 contains an ordinary air-valve $3^a$ seating outwardly by pressure from within the tube, and 7 is a screw to close the casing when not in use. Within the handle tube 1 is a relatively large tubular reservoir or receptacle 8, which is hung eccentrically on pivots 9 and 10 at its respective ends so as to turn freely about said pivots. It will be noted that this receptacle is made purposely quite large, and that it is open, at 11, near its forward end, to the chamber in the tube 1, so that it may fill with liquid from said chamber. The aperture 11 may be covered with fine wire gauze 12 (Fig. 6) so as to strain the liquid. The outer or rear pivot 9 is a simple pivot-pin, and it finds a bearing in a part of the plug 2, but the inner or front pivot 10 is tubular, and is the outlet for the liquid from the chamber in the handle. This pivot rocks or turns freely in a bearing in the cap 13, which closes the front or inner end of the tube 1. Within the receptacle 8 is a tube 14 which is open at one end and connected at its other end to the tubular pivot 10. This tube 14 lies close to the bottom of the reservoir 8. Now, assuming that the chamber in the handle is charged with a volatile liquid and compressed air, the receptacle 8 being, of course full, the compressed air must force the liquid from the chamber in the handle, first into the receptacle 8, thence in at the open end of the tube 14, and thence through this tube and the tubular journal 10, to the outlet for the liquid. As the receptacle 8 is mounted very eccentrically no matter how the horizontal handle may be rotated axially, this receptacle will remain at the bottom, as seen in Fig. 2; and it will always be full of the liquid so long as any remains in the chamber in the handle. Obviously the air can not interpose between the liquid and the outlet, no matter in what position the tool may be held. If the tool be used for soldering overhead with the bit D directed upward, the burner will be supplied from the chamber in the reservoir or receptacle 8, which is in the nature of an auxiliary reservoir. The liquid from the tubular journal 10 connects through a passage 15 in the cap 13 with a nipple 16 on said cap; said nipple is connected by a union 17, with a tube 18 extending along the stem B of the tool. This stem is in the nature of an open frame consisting of a base 19, a ring-like end-piece 20, two longitudinal bars 21 and 22, a tie-piece 23, and a pair of tie-bars 24. The stem is secured to the cap 13 of the handle by means of a screw 25 on the cap passing through the base 19, where it receives a nut 26. The base has on it studs 27 which bear on the cap 13. The bar 21 (Figs. 2, 3 and 5) has a groove in it to receive the tube 18, and a groove cap-plate 21ª, which covers and protects said tube.

The part C of the tool will be, perhaps, best understood by reference to Figs. 3 and 4. Fitted in the ring like end-piece 20 of the stem is a burner-block 28. The block has a cylindrical tenon which fits in said end-piece; a combustion chamber 29; and a burner-tip 30, forming a terminus of a bore 31, in a stem 32 on said block. The tubular stem extends back and through an aperture in the tie-piece 23, where its screw-threaded extremity receives a nut 33, which has a bearing on the tie-piece and serves to draw the block firmly against the end-piece of the stem B. The cylindrical body of the block 28 is reduced exteriorly for a considerable part of its length, and this part of the block is snugly embraced by a sleeve 34, having interiorly a circumferential recess 35, which serves as a vaporizing chamber. The sleeve 34 abuts at its ends on copper packing rings 36, and is held firmly against endwise movement by an outlet cap 37 screwed into the combustion chamber of the burner-block. Exterior to the sleeve 34, is a sleeve or casing 38 secured to the burner-block and carrying at its outer or front end the copper bit D. The liquid from the chamber in the handle, flowing through the tube 18, enters a nipple 39 screwed into the base of the burner-block and flows thence by a passage 40 in said block to the forward end of the vaporizing chamber 35. Another passage 41, from the rear end of the said chamber, leads the vapor to the bore 31. This passage 41 is also formed in the block 28. Air is admitted to the combustion-chamber 29 through passages 42 (Fig. 4) in the block 28.

The flow of the vapor or liquid to the burner tip or point of ignition, is controlled by a needle-valve device which has some novel features. This device is best illustrated in Figs. 1, 2, 3 and 10. In the tip 30 is a tapered bore through which the vapor passes to the burning point, and this tapered bore forms a continuation of the bore 31. Mounted slidably in the bore 31 is a needle which forms a controlling valve. This needle has a shank 43, which is provided with a tapered point 44, and a square shoulder 45, forming the cut-off valve, at the point where the shank of the needle joins the tapered point thereof. The shank 43 extends back and out of the stem 32 at a stuffing-box 46, and thence back through the pair of tie-bars 24. This part of the shank is screw-threaded, and on it, between said bars, is a wheel-nut 47, seen detached in Figs. 7 and 8. By means of this nut the needle may be advanced until the shoulder or valve 45 bears on the back end of the burner tip or nipple (as seen in Fig. 10) when the vapor will be cut off from the burner. It will be noted that the tapered point of the needle does not come into actual contact with and close the bore in the burner tip 30, even when the valve 45 is closed to its seat as in Fig. 10; also that the needle does not rotate axially, and also that the point where the wheel-nut 47 is placed is a very considerable distance from the burner. The reason for this construction is that the burner tip becomes very hot, and if the slender and delicate tapered point of the needle is made to serve as a cut-off valve by forcing it into close contact with the burner tip, the two will adhere under the influence of the heat and the needle-point, being also weakened by the heat, any attempt to move the needle, and especially to rotate it axially under these conditions, is very apt to destroy the needle. As the shank of the needle becomes more or less heated and sometimes quite highly heated, it is necessary, in order to get the best results, to locate the controlling nut 47 as far from the burner as the construction will permit. In the present construction this nut 47, which is shown in detail in Figs. 7 and 8, is composed of a flanged, cylindrical, metal nut, provided with a milled disk 47ª of some non-conducting material, as indurated fiber for example. This disk is secured to the flange of the metal nut by rivets, as clearly shown. The stuffing-box 46 clamps the shank of the needle tightly enough to prevent the latter from rotating when the nut 47 is turned, and it is also preferred to allow a little more space between the bars 24 than is actually required for the axial length of the nut, so that the latter may rotate a little, inoperatively, before it comes to a bearing. Figs. 1 and 2 show the sleeve or casing 38 screw-threaded and provided with an adjustable deflector 48 mounted thereon. This deflector is a well known device and it may be omitted without special detriment, or used if preferred. The purpose of the deflector is to direct the flame forward toward the bit D. There are apertures in the flange at the outer end of this deflector, and when the latter is so adjusted as to take over or house the usual holes or apertures in the sleeve 38, where the gas is ordinarily ignited, the ignition will be at the apertures in the forward end of the deflector 48. A somewhat similar deflector may be seen in the United States Patent to Hull, No. 162,657, of April 27, 1875. For a little distance back of the valve 45 on the needle the shank of the latter is reduced somewhat in size, as clearly shown in Fig. 3, to provide an annular space for the vapor coming in from the passage 41.

It may be preferred to construct the vaporizer as seen in Fig. 10. In this construction a deep screw-thread is cut on the exterior surface of the burner-lock, and the casing 38ª, which carries the copper bit D, provided with a shallow screwthread to screw onto the block. When the parts are assembled this construction will leave a spiral passage 35ª to form a vaporizer. The liquid is led into one end of this passage, follows the spiral passage to its other end, and the vapor then led to the bore 31. In Fig. 10, 37ª is the outlet cap of the combustion chamber. The liquid is poured into the handle 1 at the opening formed by removing the air-valve casing, as usual in this class of tools. It is important that the reservoir 8 should be as large as convenient, and preferably it will be a little more than one-half the diameter of the handle-tube 1. The tube 14 should lie close to the bottom of the reservoir, as shown, so as to be submerged.

Having thus described my invention, I claim—

1. A device for the purpose specified, having an elongated hollow handle provided with an inlet for air and a combustible liquid, and an outlet for the liquid, an elongated auxiliary reservoir for liquid eccentrically and pivotally mounted in the chamber of the handle at its ends, one of said pivots being tubular and connected with the liquid outlet from said chamber, said auxiliary reservoir having an inlet for liquid from the chamber in the handle, and a tube in said reservoir connected at one end with said tubular pivot and extending throughout the greater part of the length of the reservoir, being open at its free end.

2. A device for the purpose specified, having an elongated hollow handle provided at one end with an inlet for air and a combustible liquid, and at its other end with an outlet for the liquid, an elongated auxiliary reservoir for the liquid, mounted pivotally and eccentrically at its ends in the chamber in the handle, said reservoir having a diameter a little greater than one-half of the inner diameter of the chamber in which it is mounted and provided with a tubular pivot for connecting the reservoir with the outlet from said chamber, and also with an inlet for liquid in its side at the end where the tubular pivot is situated, and a tube inside of said reservoir and extending longitudinally thereof, one end of said tube being open and the other end connected for discharge with said tubular pivot.

3. A device for the purpose specified, having a hollow handle to contain a combustible liquid and compressed air and provided with a nipple, a burner, and a stem connecting the said handle and burner, said stem being secured detachably to the handle and provided with a channeled bar and cover-plate secured to said bar, a tube, for the combustible liquid, located in the channel in said bar and covered by said plate, and a union, screwing onto said nipple and coupling said tube to said nipple.

4. A device for the purpose specified having a hollow handle provided with an inlet for air and adapted to contain a combustible liquid, and an outlet for the liquid, a reservoir for liquid, pivots carried by the reservoir for eccentrically mounting the same within the hollow handle, one of such pivots being tubular and connected with the liquid outlet, said reservoir having an inlet for liquid and a tube arranged within said reservoir connected at one end with said tubular pivot.

5. A device for the purpose specified having a hollow handle provided with an inlet for air and adapted to contain a combustible liquid, and an outlet for the liquid, a reservoir for liquid, pivots carried by the reservoir for eccentrically mounting the same within the hollow handle, one of such pivots being tubular and connected with the liquid outlet, said reservoir having an inlet adjacent the end where the tubular pivot is situated, and a tube within said reservoir connected with the tubular pivot.

6. A device for the purpose specified having a hollow handle provided with an inlet for air and adapted to contain a combustible liquid, and an outlet for the liquid, a reservoir for liquid, pivots carried by the reservoir for eccentrically mounting the same within the hollow handle, one of such pivots being tubular and connected with the liquid outlet, said reservoir having an inlet for liquid, and a tube within said reservoir extending longitudinally thereof, one end of said tube being open and the other end connected for discharge with said tubular pivot.

7. A burner-device of the character specified, comprising a burner block, provided with a combustion chamber, air-inlets thereto, a burner-tip in said chamber, a deep screwthread cut in the exterior surface of said block, and fluid-passages leading to the respective ends of said screwthread, a metal sleeve embracing the screwthreaded portion of said block and provided internally with a shallow screwthread which screws onto the thread on the block, thus leaving a spiral passage for the fluid and forming a vaporizer therefor, and a suitable connection between one of said fluid passages and the burner tip.

8. A burner device of the character specified comprising a burner-block provided with a combustion chamber, air inlets thereto, a burner-tip in said chamber, a deep screw-thread cut in the exterior surface of said block, a fluid passage leading from a source of supply to the upper end of the screw-thread, and a fluid passage leading from the lower end of the screw-thread to the burner tip, a sleeve embracing the screw-thread portion of said block, and provided with a shallow screw-thread which engages a thread on the block, thus leaving a spiral passage for the fluid and forming a vaporizer therefor.

In witness whereof I have hereunto signed my name this 1st day of December, 1905, in the presence of two subscribing witnesses.

BERNHARD TROPP.

Witnesses:
HENRY CONNETT,
H. G. HOSE.